United States Patent
Kopf et al.

(10) Patent No.: US 10,038,894 B1
(45) Date of Patent: Jul. 31, 2018

(54) THREE-DIMENSIONAL SCENE RECONSTRUCTION FROM SET OF TWO DIMENSIONAL IMAGES FOR CONSUMPTION IN VIRTUAL REALITY

(71) Applicant: Facebook, Inc., Menlo Park, CA (US)

(72) Inventors: Johannes Peter Kopf, Seattle, WA (US); Lars Peter Johannes Hedman, Seattle, WA (US); Richard Szeliski, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/489,503

(22) Filed: Apr. 17, 2017

Related U.S. Application Data (60) Provisional application No. 62/447,128, filed on Jan. 17, 2017.

(51) Int. Cl.
*G06K 9/00* (2006.01)
*H04N 13/282* (2018.01)
(Continued)

(52) U.S. Cl.
CPC ......... *H04N 13/282* (2018.05); *G06T 3/0093* (2013.01); *G06T 3/4038* (2013.01); *H04N 13/0022* (2013.01); *H04N 13/0037* (2013.01); *H04N 13/026* (2013.01); *H04N 13/0221* (2013.01); *H04N 13/0271* (2013.01); *H04N 13/0282* (2013.01); *H04N 13/128* (2018.05); *H04N 13/15* (2018.05); *H04N 13/221* (2018.05); *H04N 13/261* (2018.05);
(Continued)

(58) Field of Classification Search
None
See application file for complete search history.

(56) References Cited

U.S. PATENT DOCUMENTS

| | | | | |
|---|---|---|---|---|
| 8,411,091 B2* | 4/2013 | Horri | ............... | G06N 3/006 345/419 |
| 8,717,405 B2* | 5/2014 | Li | ............... | H04N 7/15 348/14.08 |

(Continued)

OTHER PUBLICATIONS

Lee et al., "Panoramic scene generation from multi-view images with close foreground objects", PCS2010, Dec. 2010.*

(Continued)

*Primary Examiner* — Soo Park
(74) *Attorney, Agent, or Firm* — Fenwick & West LLP (57) ABSTRACT

To enable better sharing and preservation of immersive experiences, a graphics system reconstructs a three-dimensional scene from a set of images of the scene taken from different vantage points. The system processes each image to extract depth information therefrom and then stitches the images (both color and depth information) into a multi-layered panorama that includes at least front and back surface layers. The front and back surface layers are then merged to remove redundancies and create connections between neighboring pixels that are likely to represent the same object, while removing connections between neighboring pixels that are not. The resulting layered panorama with depth information can be rendered using a virtual reality (VR) system, a mobile device, or other computing and display platforms using standard rendering techniques, to enable three-dimensional viewing of the scene.

20 Claims, 5 Drawing Sheets

(51) Int. Cl.
*H04N 13/02* (2006.01)
*G06T 3/00* (2006.01)
*G06T 3/40* (2006.01)
*H04N 13/00* (2018.01)
*H04N 13/128* (2018.01)
*H04N 13/15* (2018.01)
*H04N 13/221* (2018.01)
*H04N 13/261* (2018.01)
*H04N 13/271* (2018.01)
*G06T 7/579* (2017.01)

(52) U.S. Cl.
CPC ........... *H04N 13/271* (2018.05); *G06T 7/579* (2017.01); *G06T 2207/10012* (2013.01); *G06T 2207/10028* (2013.01); *H04N 2013/0081* (2013.01)

(56) References Cited

U.S. PATENT DOCUMENTS

| | | | |
|---|---|---|---|
| 9,185,288 B2* | 11/2015 | Ki | .................. H04N 5/23238 |
| 2002/0061131 A1 | 5/2002 | Sawhney et al. | |
| 2008/0152200 A1 | 6/2008 | Medioni et al. | |
| 2014/0118482 A1 | 5/2014 | Noh et al. | |
| 2014/0184640 A1* | 7/2014 | Putraya | ................. G06T 3/4038 |
| | | | 345/629 |
| 2016/0037082 A1 | 2/2016 | Wang et al. | |

OTHER PUBLICATIONS

International Search Report and Written Opinion, PCT Application No. PCT/US2017/031839, dated Oct. 19, 2017, twelve pages.

Extended European Search Report, European Patent Application No. 17180515.3, Dec. 1, 2017, nine pages.

Kang et al., "Extracting View-Dependent Depth Maps from a Collection of Images," International Journal of Computer Vision, vol. 58, Issue 2, Jul. 2004, pp. 139-163.

Strecha C. et al., "Combined Depth and Outlier Estimation in Multi-View Stereo," 2006 IEEE Computer Society Conference on Computer Vision and Pattern Recognition, Jun. 17-22, 2006, vol. 2, Jun. 17, 2006, pp. 2394-2401.

Zheng, K.C. et al., "Layered Depth Panoramas," IEEE Conference on Computer Vision and Pattern Recognition, Jun. 17-22, 2007, CVPR '07, Jun. 17, 2007, eight pages.

* cited by examiner

THREE-DIMENSIONAL SCENE RECONSTRUCTION FROM SET OF TWO DIMENSIONAL IMAGES FOR CONSUMPTION IN VIRTUAL REALITY

CROSS-REFERENCE TO RELATED APPLICATIONS

This application claims the benefit of U.S. Provisional Patent Application No. 62/447,128 filed on Jan. 17, 2017, the content of which is incorporated by reference herein.

BACKGROUND

This disclosure relates generally to rendering three-dimensional images and more specifically to reconstructing a three-dimensional scene from a set of two-dimensional images.

People take pictures of scenes that they experience so they can share their experiences with others or to re-experience the scene at a later time. Unfortunately, technical limitations limit how well the subsequent experience is relived. Two-dimensional images do not provide the full three-dimensional experience of being there, and people usually do not carry around expensive and bulky three-dimensional cameras. Accordingly, it would be useful to enable people to capture a scene and digitally preserve it in a way that allows the person or friends to virtually immerse themselves in the scene and re-experience the sensation of being there at a later time. Preferably, this would be as easy as taking a picture today, using a standard phone or camera.

SUMMARY

A method, non-transitory computer-readable storage medium, and image reconstruction system generates a three-dimensional image from a plurality of two-dimensional input images. A plurality of input images of a scene is received in which the input images are taken from different vantage points. The input images may have varying amounts of overlap with each other and varying camera orientations. The plurality of input images is processed to generate a sparse reconstruction representation of the scene. The sparse reconstruction representation including a sparse point cloud specifying locations of a plurality of points that correspond to three-dimensional locations of surfaces of objects in the scene. Based in part on the sparse reconstruction representation, the plurality of input images is processed to generate respective dense reconstruction representations of each of the plurality of input images. Here, each of the respective dense reconstruction representations include a respective depth image for a corresponding input image in which the depth image includes both color and depth information. Front surfaces of the depth images are projected using a forward depth test to generate a plurality of front-warped images. Back surfaces of the depth images are projected using an inverted depth test to generate a plurality of back-warped images. The front-warped images and the back-warped images are stitched to generate a two-layer panorama having a front surface panorama and a back surface panorama. The front surface panorama and the back surface panorama are then fused to generate the three-dimensional image comprising a multi-layered geometric mesh suitable for rendering the scene in the three-dimensional space.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a method comprises:
receiving a plurality of input images of a scene taken from different vantage points; processing the plurality of input images to generate a sparse reconstruction representation of the scene, the sparse reconstruction representation including a sparse point cloud specifying locations of a plurality of points that correspond to three-dimensional locations of surfaces of objects in the scene;
based in part on the sparse reconstruction representation, processing the plurality of input images to generate respective dense reconstruction representations of each of the plurality of input images, the respective dense reconstruction representations each including respective depth images for the plurality of input images, the depth images including color and depth information;
projecting front surfaces of the depth images using a forward depth test to generate a plurality of front-warped images;
projecting back surfaces of the depth images using an inverted depth test to generate a plurality of back-warped images;
stitching the front-warped images and the back-warped images to generate a two-layer panorama having a front surface panorama and a back surface panorama; and
fusing the front surface panorama and the back surface panorama in the two-layer panorama to generate the three-dimensional image comprising a multi-layered geometric mesh suitable for rendering the scene in the three-dimensional space.

Processing the plurality of input images to generate the sparse reconstruction representation may comprise:
applying a surface-from-motion algorithm to the plurality of input images.

Processing the plurality of input images to generate the respective dense reconstruction representations may comprise:
generating a near envelope prior that assigns a cost to estimated depth values in front of a near envelope; and
applying a multi-view stereo processing algorithm to estimate the depth values based on a cost function including the near envelope prior.

Generating the near envelope prior may comprise:
identifying anchor pixels in the plurality of input images that have high confidence depth estimates;
propagating the depth estimates of the anchor pixels to other pixels in the plurality of input images to generate approximate depth maps;

filtering the approximate depth maps to determine a near envelope; and
generating the near envelope prior based on the depth estimates and the near envelope.

Stitching the front-warped images and the back-warped images to generate a two-layer panorama may comprise:
stitching a depth panorama using depth values from the front-warped images;
stitching the front surface panorama using color values from the front-warped images and stitched depth values from the depth panorama;
stitching the back surface panorama using color values from the back-warped images and the stitched depth values from the depth panorama; and
combining the front surface panorama and the back surface panorama into the two-layer panorama.

Fusing the front surface panorama and the back surface panorama may comprise:
removing background pixels from the back surface panorama that match corresponding foreground pixels in the front surface panorama;
storing connections between neighboring pixels meeting a threshold similarity in depth and color information; and
hallucinating color and depth information in missing pixel locations.

In an embodiment according to the invention, a method may comprise:
generating a normal map for the multi-layered geometric mesh, the normal map estimating for each pixel, an angle normal to a surface depicted by the pixel.

Generating the normal map may comprise:
generating a base normal map from depth values in the three-dimensional image;
generating a detailed normal from luminance values in the three-dimensional image; and
transforming the detailed normal map onto the base normal map to generate a combined normal map.

The plurality of input images may have varying levels of overlap and orientation changes.

In an embodiment according to the invention, a non-transitory computer-readable storage medium may store instructions, the instructions when executed by a processor may cause the processor to perform steps including:
receiving a plurality of input images of a scene taken from different vantage points;
processing the plurality of input images to generate a sparse reconstruction representation of the scene, the sparse reconstruction representation including a sparse point cloud specifying locations of a plurality of points that correspond to three-dimensional locations of surfaces of objects in the scene;
based in part on the sparse reconstruction representation, processing the plurality of input images to generate respective dense reconstruction representations of each of the plurality of input images, the respective dense reconstruction representations each including respective depth images for the plurality of input images, the depth images including color and depth information;
projecting front surfaces of the depth images using a forward depth test to generate a plurality of front-warped images;
projecting back surfaces of the depth images using an inverted depth test to generate a plurality of back-warped images;
stitching the front-warped images and the back-warped images to generate a two-layer panorama having a front surface panorama and a back surface panorama;
fusing the front surface panorama and the back surface panorama in the two-layer panorama to generate the three-dimensional image comprising a multi-layered geometric mesh suitable for rendering the scene in the three-dimensional space.

Processing the plurality of input images to generate the sparse reconstruction representation may comprise:
applying a surface-from-motion algorithm to the plurality of input images.

Processing the plurality of input images to generate the respective dense reconstruction representations may comprise:
generating a near envelope prior that assigns a cost to estimated depth values in front of a near envelope; and
applying a multi-view stereo processing algorithm to estimate the depth values based on a cost function including the near envelope prior.

Generating the near envelope prior may comprise:
identifying anchor pixels in the plurality of input images that have high confidence depth estimates;
propagating the depth estimates of the anchor pixels to other pixels in the plurality of input images to generate approximate depth maps;
filtering the approximate depth maps to determine a near envelope; and
generating the near envelope prior based on the depth estimates and the near envelope.

Stitching the front-warped images and the back-warped images to generate a two-layer panorama may comprise:
stitching a depth panorama using depth values from the front-warped images;
stitching the front surface panorama using color values from the front-warped images and stitched depth values from the depth panorama;
stitching the back surface panorama using color values from the back-warped images and the stitched depth values from the depth panorama; and
combining the front surface panorama and the back surface panorama into the two-layer panorama.

Fusing the front surface panorama and the back surface panorama may comprise:
removing background pixels from the back surface panorama that match corresponding foreground pixels in the front surface panorama;
storing connections between neighboring pixels meeting a threshold similarity in depth and color information; and
hallucinating color and depth information in missing pixel locations.

The instructions when executed by processor further may cause the processor to perform steps including:
generating a normal map for the multi-layered geometric mesh, the normal map estimating for each pixel, an angle normal to a surface depicted by the pixel.

Generating the normal map may comprise:
generating a base normal map from depth values in the three-dimensional image;
generating a detailed normal from luminance values in the three-dimensional image; and transforming the detailed normal map onto the base normal map to generate a combined normal map.

The plurality of input images may have varying levels of overlap and orientation changes.

In an embodiment according to the invention, a system may comprise:
a processor; and
a non-transitory computer-readable storage medium storing instruction for generating a three-dimensional image, the instructions when executed by a processor causing the processor to perform steps including:

receiving a plurality of input images of a scene taken from different vantage points;

processing the plurality of input images to generate a sparse reconstruction representation of the scene, the sparse reconstruction representation including a sparse point cloud specifying locations of a plurality of points that correspond to three-dimensional locations of surfaces of objects in the scene;

based in part on the sparse reconstruction representation, processing the plurality of input images to generate respective dense reconstruction representations of each of the plurality of input images, the respective dense reconstruction representations each including respective depth images for the plurality of input images, the depth images including color and depth information;

projecting front surfaces of the depth images using a forward depth test to generate a plurality of front-warped images;

projecting back surfaces of the depth images using an inverted depth test to generate a plurality of back-warped images;

stitching the front-warped images and the back-warped images to generate a two-layer panorama having a front surface panorama and a back surface panorama;

fusing the front surface panorama and the back surface panorama in the two-layer panorama to generate the three-dimensional image comprising a multi-layered geometric mesh suitable for rendering the scene in the three-dimensional space.

Stitching the front-warped images and the back-warped images to generate a two-layer panorama may comprise:

stitching a depth panorama using depth values from the front-warped images;

stitching the front surface panorama using color values from the front-warped images and stitched depth values from the depth panorama;

stitching the back surface panorama using color values from the back-warped images and the stitched depth values from the depth panorama; and combining the front surface panorama and the back surface panorama into the two-layer panorama.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

To enable better sharing and preservation of immersive experiences, a graphics system reconstructs a three-dimensional scene from a set of images of the scene taken from different vantage points. The system processes each image to extract depth information therefrom and then stitches the images (both color and depth information) into a multi-layered panorama that includes at least front and back surface layers. The front and back surface layers are then merged to remove redundancies and create connections between neighboring pixels that are likely to represent the same object, while removing connections between neighboring pixels that are not. The resulting layered panorama with depth information can be rendered using a virtual reality (VR) system, a mobile device, or other computing and display platforms using standard rendering techniques, to enable three-dimensional viewing of the scene.

System Architecture

Figure 1:
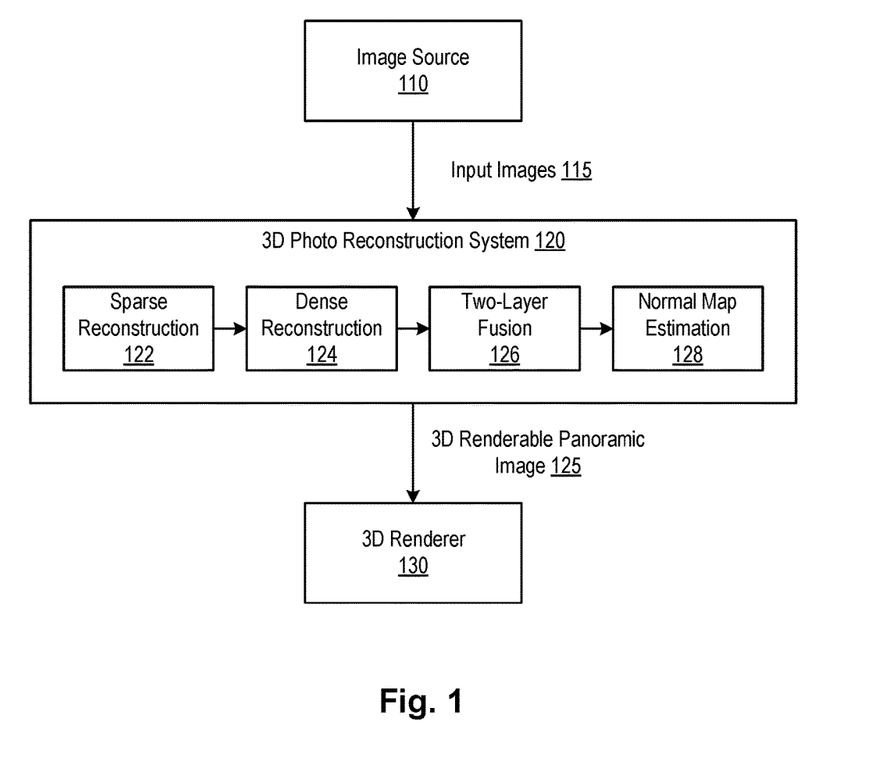
FIG. 1 is a block diagram illustrating an example embodiment of a system for generating a three-dimensional image from a plurality of two-dimensional input images.

FIG. 1 illustrates a system for reconstructing a three-dimensional scene from a set of images, in accordance with one embodiment. As depicted, an image capture system 110 (e.g., a camera) is used to take a set of images 115 from different viewing positions in a scene and outputs the images 115 to a three-dimensional (3D) photo reconstruction system 120. The three-dimensional photo reconstruction system 120 processes the images 115 to generate a three-dimensional renderable panoramic image 125. The three-dimensional renderable panoramic image 125 is outputted to a three-dimensional renderer 130 that renders a three-dimensional image for display. In alternative embodiments, additional intermediate components may be included that are not expressly shown in FIG. 1. For example, an image storage (e.g., a database) may be included between the image capture system 110 and the three-dimensional photo reconstruction system 120 to store images 115 until selected for processing. Similarly, an image storage may exist between the three-dimensional photo reconstruction system 120 and the three-dimensional renderer 130 to store the renderable panoramic image 125. Additionally, conventional networking components may facilitate communications between the various systems 110, 120, 130, any intermediate components (e.g., storage systems), or different individual modules of the 3D photo reconstruction system 120 described below. Each of the illustrated systems 110, 120, 130 may include one or more processors and a computer-readable storage medium that stores instructions that when executed cause the respective systems to carry out the processes and functions attributed to the systems 110, 120, 130 described herein. In different embodiments, systems 110, 120, 130 or portions thereof may operate on a client computer device, one a cloud server, on an enterprise server, or a combination thereof. For example, in one embodiment, the 3D photo reconstruction system 120 operates on one or more cloud servers associated with a social networking system or other online system. In this example, a user having an account with the social networking system may upload a set of photos to the social networking system as the input images 115. The 3D photo reconstruction system 120 may operate on a cloud server to generate the 3D image and provide it to the social networking system for rendering to viewers (e.g., as a profile image or post on the user's profile page).

The image capture system 110 may comprise any system capable of taking a set of images of a scene, such as a standalone consumer camera or a camera built into a phone or other mobile device. Such cameras may include, for example, a digital single-lens reflex (DSLR) camera, a 360 degree camera, or other wide field of view camera. The image capture system 110 may also include a camera that is wearable on a human, such as outward facing cameras in a virtual reality (VR) or augmented reality (AR) headset. The image capture system 110 may capture individual still images or video of the scene.

The image capture system 110 may capture the set of images in an unstructured manner. For example, the particular positions from which each image is captured do not need to be at precise known positions and the images may have varying amounts of overlap or differences in orientation. Furthermore, the number of images captured may be arbitrary within reasonable upper and lower bounds. In one example, the set of images may be taken by moving the image capture system 110 sideways (e.g., at half arm's length) while taking a series of still images. In another embodiment, the images may be taken by multiple different cameras positioned at different locations. Generally, to form a cohesive representation of the captured scene, at least some of the images may overlap with one or more other images. Thus, the images captured by the image capture system 110 may be captured quickly in a simple user-friendly manner without requiring special equipment or specialized knowledge about how to position the camera.

The image capture system 110 may also include software coupled to the camera that assists the user in capturing images, such as by guiding the user to take a sufficient number of images to capture the scene. The software may be embodied, for example, as instructions on a non-transitory computer-readable storage medium of a camera, client computer device, or on a cloud server communicatively coupled to the camera. To this end, the software may use motion or position sensors in the image capture system to record approximate relative positions of the capture for each image and possibly to help guide the user when capturing the images. For example, in one embodiment, simultaneous localization and mapping (SLAM) technology may be applied to determine the user's estimated location as the user moves through the scene or moves the image capture system 110 around. The software can then track the views that are obtained and may provide the user guidance as to what additional views may be desirable for the three-dimensional reconstruction. In one embodiment, a fast panoramic image preview (e.g., a 360 degree image) may be generated and made accessible to the user on the image capture system 110 or other connected device (e.g., any device suitable for displaying image content) to enable the user to see a preview of the views captured at any point during image capture. This may be useful to help guide the user to capture additional views that may be missing from the panoramic image. In another embodiment, the image capture system 110 may perform content or face recognition on the captured images to identify faces or other objects of interest. The image capture system 110 may then provide real-time feedback to the user during capture to alert the user if a face or object of interest is detected but insufficient views of that face or objected have been captured. Thus, the image capture system 110 may guide the user to ensure that an adequate number of images of faces or objects of interest are obtained so that they may be effectively rendered in the three-dimensional reconstruction.

The image capture system 110 may furthermore include software for selecting a set of images that are suitable for processing by the three-dimensional reconstruction system 120 from a larger collection of images. For example, in one embodiment, images that are intended for re-constructing into a three-dimensional renderable image may be tagged with metadata to indicate that they were captured as part of an image capture sequence specifically for this purpose. Alternatively, the image capture system 110 may selectively determine images that are suitable for reconstruction based on a number of criteria, such as being captured within a time threshold or within physical proximity to a certain location. The images may be selected from discrete images or from frames of video captured by the image capture system 110.

The image capture system 110 may include multiple cameras that may be operated by separate users to capture images of a scene. The images may be stored to a common database and may be processed to select suitable images in the same way that images from a single camera may be processed. For example, in one scenario, multiple users may upload images so that several users can share images captured by others and reconstruct the scene using the shared images. In a social networking environment, social connections may be used to determine which images are available to others. For example, a user may set a privacy setting to indicate which other users can access and use their images, which may be set based on social connections between the users.

In an embodiment, the image capture system 110 may capture video suitable for three-dimensional reconstruction in which at each time instance, a frame of video is captured from multiple vantage points in the same manner described above. Reference to "images" herein, may therefore also correspond to video frames.

Before the set of images is used by the three-dimensional photo reconstruction system, one or more pre-processing tasks may be performed on the images. For example, the images may be transcoded into a predefined format and file quality.

The set of images is then provided to the three-dimensional (3D) photo reconstruction system 120, which converts the set of images into a three-dimensional renderable panoramic image with multiple layers and depth information. The three-dimensional photo reconstruction system 120 includes several functional modules for performing this conversion task, including a sparse reconstruction module 122, a dense reconstruction module 124, a two-layer fusion module 126, and a normal map estimation module 128. The sparse reconstruction module 122 processes the input images 115 to generate a sparse reconstruction representation of the scene. The dense reconstruction module 124 then uses the sparse reconstruction representation to generate depth maps for each of the input images 115. The dense reconstruction module 124 may apply a modified multi-view stereo algorithm that results in improved depth estimations relative to conventional algorithms executing in this context. Once the depth information is densified by the dense reconstruction module 124, the depth images including the original set of images and their corresponding depth maps are provided to the two-layer fusion module 126. The two-layer fusion module 126 merges the depth images into a multi-layer panorama comprising, for example, a two-layer panoramic mesh that is renderable by the three-dimensional renderer 130. The normal map estimation module 128 estimates normals for surfaces of the two-layer panoramic mesh that can be used in by the renderer 130 to add various effects such as lighting or flooding effects to the rendered image. Processes performed by each of these modules are described in further detail below.

Once the three-dimensional renderable panoramic image is constructed, it may be rendered for viewing by the three-dimensional renderer 130. The three-dimensional renderer 130 may comprise, for example, a virtual reality (VR) system, a mobile device, or other computing and display platforms that can display rendered three-dimensional content using standard rendering techniques.

The above-described modules can operate on a set of images corresponding to an individual time instance to reconstruct a three-dimensional image, or can operate on a sequence of image sets, with each of the image sets have a set of video frames from different videos captured from different vantage points. The sparse reconstruction module 122, dense reconstruction module 124, two-layer fusion module 126, normal map estimation module 128, and renderer 130 may then operate to generate a three-dimensional frame from each image set. The sequence of three-dimensional frames may be stored in sequence as a three-dimensional video of the scene.

Three-Dimensional Photo Reconstruction
Sparse Reconstruction

Figure 2:
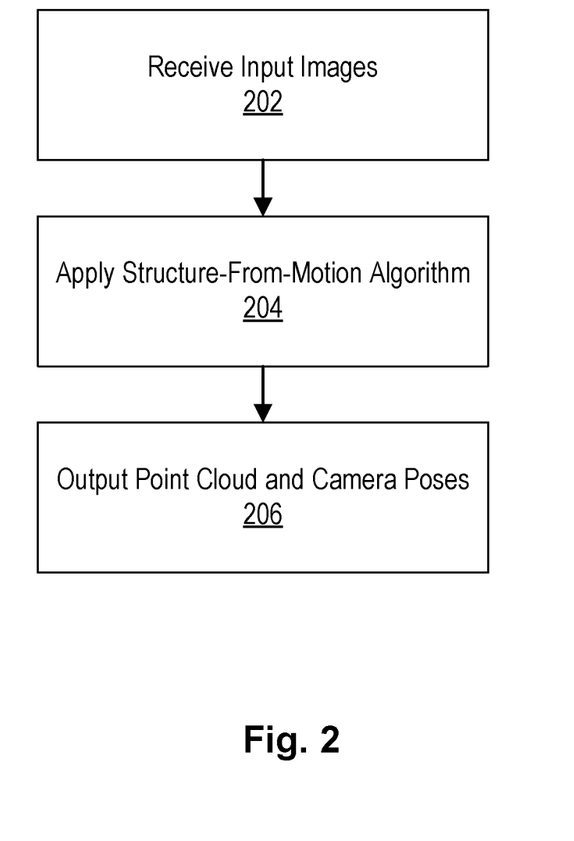
FIG. 2 is a flowchart illustrating an embodiment of a process for generating a sparse reconstruction representation of a scene.

FIG. 2 illustrates an embodiment of a process performed by the sparse reconstruction module 122 for generating a sparse reconstruction representation from a plurality of input images. A plurality of input images are received 202. The input images comprise two-dimensional images that may be pre-selected as images that are suitable for reconstruction into the three-dimensional image. Generally, the input images include a set of images of a scene captured from different vantage points, with at least some of the input images overlapping other images of the scene.

The sparse reconstruction module applies 204 a structure-from-motion algorithm to the input images that reconstructs three-dimensional structure from its projections into the set of input images. An example of structure-from-motion algorithm that may be suitable for this purpose is COLMAP. From the result of the structure-from-motion algorithm, the sparse reconstruction module 122 outputs the sparse reconstruction representation that may include a set of camera poses for each image and a point cloud approximation of the scene depicted in the images. Here, the set of camera poses may include, for each image, intrinsic camera parameters such as focal length, image sensor format, and principal point, and extrinsic camera parameters denoting the position and orientation of the camera (relative to the scene) when the image was captured. The point cloud comprises a sparse set of data points in a three-dimensional space that represent external surfaces of objects detected in the scene.

Dense Reconstruction

Figure 3:
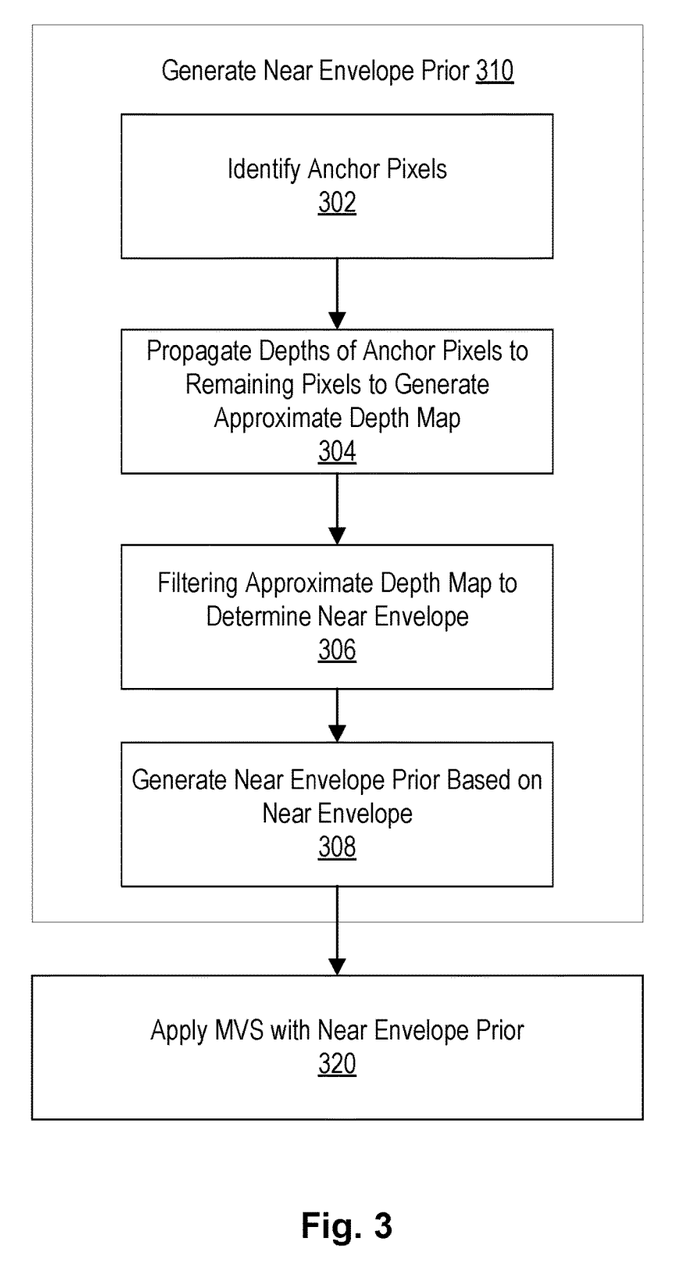
FIG. 3 is a flowchart illustrating an embodiment of a process for generating a dense reconstruction representation of a scene.

FIG. 3 illustrates an embodiment of a process performed by the dense reconstruction module 124 for generating the dense reconstruction representations using a near envelope prior. The dense reconstruction representation provided by the process comprises a plurality of depth images corresponding to the original input images. The depth images include the color information from the respective original input images and include a depth map for each image that indicates, for each pixel, an estimated distance to a surface of an object in the scene depicted by that pixel given the viewpoint of the image.

In an embodiment, generating the dense reconstruction representation may be achieved by first computing 310 the near envelope prior and then applying 320 a modified plane-sweep multi-view stereo (MVS) algorithm that includes the near envelope reconstruction prior as an additional cost function. In conventional MVS algorithms, near-depth hypotheses may be noisy because these points are seen in fewer images and the photo consistency measure is therefore less reliable. This unreliability makes existing MVS algorithms more likely fall victim to common stereo pitfalls, such as repeated structures in the scene, slight scene motion, or materials with view-dependent (shiny) appearance. The near envelope reconstruction prior addresses these limitations as described below.

The MVS algorithm treats depth estimation as an energy minimization problem, which optimizes the pixel depths $d_i$ by solving the following problem:

$$\operatorname*{argmin}_{d} \sum_{i} E_{data}(i) + \lambda_{smooth} \sum_{(i,j) \in N} E_{smooth(i,j)}, \quad (1)$$

where i is a pixel and $c_i$ is its color. The smoothness term $E_{smooth}$ is the product of a color- and a depth-difference cost, $$E_{smooth}(i,j) = w_{color}(c_i, c_j) w_{depth}(d_i, d_j), \quad (2)$$

where $w_{color}$ is a color difference cost between color $c_i$ and $c_j$ and $w_{depth}$ is a depth difference cost between depths $d_i$ and $d_j$. The smoothness term $E_{smooth}$ encourages the depth map to be smooth wherever the image lacks texture. The data term combines three costs:

$$E_{data}(i) = E_{photo}(i) + E_{sky}(i) + E_{sfm}(i), \quad (3)$$

The photo-consistency term $E_{photo}$ measures the agreement in appearance between a pixel and its projection into multiple other images. This calculation may use the camera poses from the sparse reconstruction module 122 to project pixels into other images in order to determine the agreement in appearance. The sky prior $E_{sky}$ encourages large depths for pixels that are classified by a sky detector as likely be part of sky. The structure from motion prior $E_{sfm}$ encourages the result to stay close to the sparse reconstruction.

The dense reconstruction module 124 discretizes the potential depth labels and uses the plane-sweep stereo algorithm to build a cost volume with depth hypotheses for each pixel. While this restricts the algorithm to reconstructing discrete depths without normal, it has the advantage that it can extract a globally optimized solution using a Markov random field (MRF) solver, which can often recover plausible depth for textureless regions using its smoothness term. The dense reconstruction module 124 optimizes the MRF at a reduced resolution, e.g., using a FastPD library for performance reasons. The dense reconstruction module 124 then upscales the result to full resolution with a joint bilateral upsampling filter, e.g., using a weighted median filter instead of averaging to prevent introducing erroneous middle values at depths discontinuities.

The near envelope is an estimate of a conservative but tight lower bound $n_i$ for the pixel depths at each pixel. This boundary is used to discourage nearby erroneous depths by augmenting the data term ($E_{data}(i)$) in Eq. (3) to include the following additional cost term in the sum:

$$E_{near}(i) = \begin{cases} \lambda_{near} & \text{if } d_i < n_i \\ 0 & \text{otherwise} \end{cases}, \quad (4)$$

where $\lambda_{near}$ is a predefined parameter (e.g., $\lambda_{near}=1$). The additional cost term $E_{near}$ penalizes reconstructing depths closer than the near envelope, thus reducing or eliminating erroneously low depth estimates in the depth maps.

To compute the near envelope n the dense reconstruction module 124 first identifies 302 anchor pixels with reliable depth estimates. The dense reconstruction module 124 computes the anchors from two sources: (1) stereo matching where it is reliable, and (2) the point features already computed in the point cloud during the sparse reconstruction. Stereo matching is known to work well at strong image gradients. This is used by computing a lightweight MVS result and carefully considering the pixels around image edges for anchors. The dense reconstruction module 124 obtains a noisy depth map by independently computing the minimum of $E_{data}$ for each pixel, e.g., dropping the smoothness term from Eq. 1. The dense reconstruction module 124 uses a geometric consistency filter with aggressive settings to discard a significant portion of the incorrectly estimated depth values. An edge detector is used to compute an edge mask. If the image edge coincides with a depth edge, it is desirable to ensure that the depth belonging to the front layer is selected. This may be achieved by dilating the edge mask by 1 pixel and applying a 5×5 morphological minimum filter to the masked pixels inside the detected edges. In addition to these anchors computed from stereo, the dense reconstruction module 124 also adds all the sparse point features that are observed in the image to the set of anchor pixels.

The dense reconstruction module 124 propagates 304 the depths of the anchor pixels to the remaining pixels to generate an approximate depth map. The sparse anchor depths are spread to the remaining pixels by solving a first-order Poisson system, similar to the one used in the colorization algorithm:

$$\underset{x}{\text{argmin}} \sum_i w_i(x_i - x'_i)^2 + \sum_{(i,j) \in N} w_{ij}(x_i - x_j)^2, \quad (5)$$

where $x'_i$ are the depths of the anchor pixels (where defined), and $x_j$ are the densely propagated depths solved for, $w_{ij}=e^{-(c^i-c^j)^2/2\sigma^2_{env}}$ is the color-based affinity term, and $w_i$ is a unary weight term that represents confidence in each anchor:

$$w_i = \begin{cases} 0.5 & \text{if } x_i \text{ is a feature observed in 2 images} \\ 2 & \text{if } x_i \text{ is a feature observed in 3 images} \\ 10 & \text{if } x_i \text{ is a feature in} \geq 4 \text{ images, or an edge depth} \end{cases} \quad (6)$$

The dense reconstruction module 124 then filters 306 the approximate depth maps to determine the near envelope. For example, the dense reconstruction module 124 makes the propagated depths more conservative by multiplying them with a constant factor (e.g., 0.6) and subsequently applying a morphological minimum filter with diameter set to about 10% of the image diagonal. They are further cleaned up by smoothing with a wide Gaussian kernel ($\sigma$ set to about 5% of the diagonal). The near envelope prior $E_{near}(i)$ is then computed 308 from the near envelope n based on Eq. (4) above.

In one embodiment, various image processing techniques may be applied to detect and correct errors in the images that may otherwise cause the densification algorithm to fail.

Two-Layer Fusion

Figure 4:
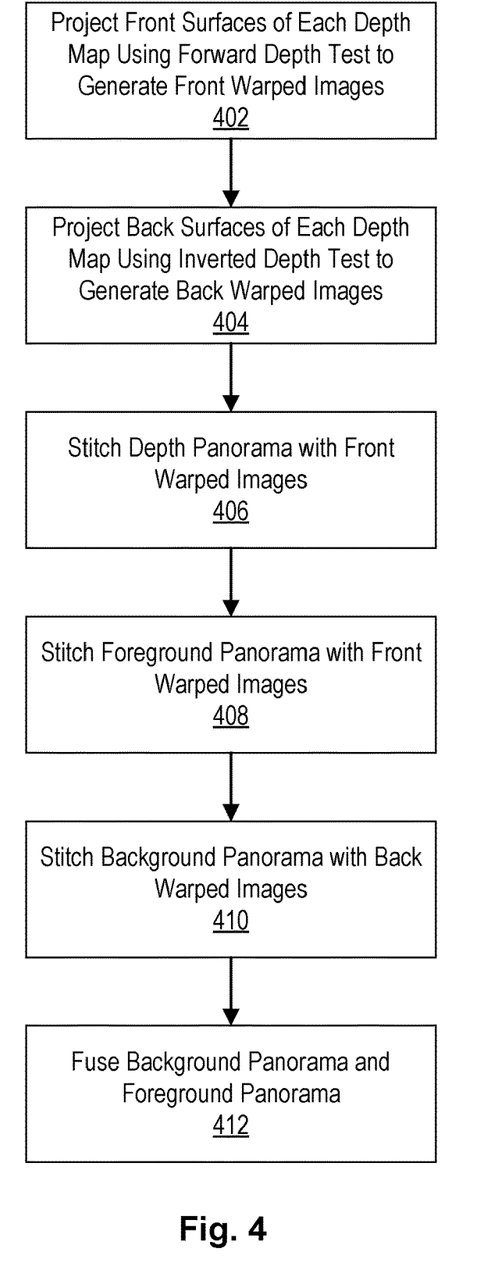
FIG. 4 is a flowchart illustrating an embodiment of a process for fusing a plurality of depth images into a multi-layer panoramic image.

FIG. 4 illustrates an embodiment of a process performed by the two-layer fusion module 126 to generate the two-layer panorama. Here, the two-layer fusion module 126 warps each depth map into a central panoramic image (using equirectangular projection) by triangulating it into a grid-mesh and rendering it with the normal rasterization pipeline, letting the depth test select the front surface when multiple points fall onto the same panorama. The warping may utilize the camera poses estimated by the sparse reconstruction module 122. For example, the camera poses and depth maps may be used together to place each pixel at a world-space position for creating the grid-mesh. In this process, a z-buffering technique may be used in which graphics are rendered incrementally (i.e., one triangle after another) into a color buffer and a z-buffer is used to store the depth of every pixel rendered. When a new triangle is rendered each of its pixel's z-values is depth tested against the z-buffer and only rendered if it has a depth smaller than the current value of the z-buffer. In this technique, only the front-most surfaces appear in the final image.

One problem with a simple approach to this task is that long stretched triangles at depth discontinuities connecting foreground and background pixels might obscure other good content, and it is undesirable to include them in the stitch in any case. The problem can be resolved by blending the z-values of the rasterized fragments with a stretch penalty $s \in [0, 1]$ before the depth test, $z'=(z+s)/2$. The division by 2 keeps the value z' in normalized clipping space. The stretch penalty, $$s = 1 - \min\left(\frac{\alpha}{\tau_{stretch}}, 1\right) \quad (7)$$

considers the grazing angle $\alpha$ from the original viewpoint and penalizes small values below $\tau_{stretch}$ (e.g., $\tau_{stretch}=1.66°$), i.e. rays that are nearly parallel to the triangle surface. This modification pushes highly stretched triangles back, so potentially less stretched back surfaces can win over instead.

Since the system operates to reconstruct not just the first visible surface, but several depth layers, it generates a second back surface warp for each image. One possible way to generate these is depth peeling; however, this method is best suited for systems that can depend on having very accurate depth maps available. More robust results with less reliable depth maps can be achieved, instead, by assuming a depth complexity of two and projecting surfaces using different depth tests prior to stitching.

In the process of FIG. 4, the front-most surfaces of each depth map are first projected 402 into an equirectangular projection using z' for the depth test to generate a front-warped image for each of the depth images. The back-most surfaces of each depth map are projected 404 into an equirectangular projection using $z'=1-z'$ for the depth test, effectively inverting it so that the back-most surfaces appear in the back-warped image instead of the front-most surfaces.

Once the depth maps are warped into a common perspective (or camera pose), the two-layer fusion module 126 can stitch the warped images into front and back surface panoramas. For scenes where exposure brackets are captured, this is where all the exposures are fused. The colors are linearized using a naive gamma=2.2 assumption, and multiplied with the appropriate exposure factor.

The stitching described above may be performed by solving a discrete pixel labeling problem, where each pixel i in the panorama chooses the label a, from one of the warped sources. The labels may be chosen by minimizing the energy of a cost function that may depend on, for example, a stereo confidence weight, a triangle stretch weight, an exposure penalty, and a depth penalty, a pairwise color match, and a depth disparity.

For example, in one embodiment, the two-layer fusion module 126 stitches 406 the depth maps of the front-warped depth images to generate a depth-only panorama. To stitch the depth panorama, the two-layer fusion module 126 optimizes this objective:

$$\underset{\{\alpha_i\}}{\operatorname{argmin}} \underbrace{\lambda_1 E_{stereo} + \lambda_2 E_{stretch}}_{\text{Data terms}} + \underbrace{\lambda_3 E_{color} + \lambda_4 E_{disp}}_{\text{Smoothness terms}}, \quad (8)$$

The stereo data term encourages selecting pixels whose depth was estimated with high confidence. The two-layer fusion module 126 uses the maximum-likelihood measure of:

$$E_{stereo} = \sum_i -\log MLM_i^{\alpha_i}, \quad (9)$$

but only for pixels that pass the geometric consistency test. For inconsistent pixels the two-layer fusion module 126 sets $MLM_i^{\alpha i}=0.001$. The triangle stretch term discourages selecting pixels from long "rubber sheet" triangles:

$$E_{stretch} = \sum_i -\log s_i^{\alpha_i}, \quad (10)$$

The color smoothness term is a truncated version of the seam-hiding pairwise cost from "GraphCut Textures":

$$E_{color} = \sum_{i,j \in N} \min(\|c_i^{\alpha_i} - c_i^{\alpha_j}\|_2^2, \tau_c) + \min(\|c_j^{\alpha_i} - c_j^{\alpha_j}\|_2^2, \tau_c), \quad (11)$$

and the disparity smoothness term is a similar truncated term:

$$E_{disp} = \sum_{i,j \in N} \min\left(\left|\frac{1}{d_i^{\alpha_i}} - \frac{1}{d_i^{\alpha_j}}\right|, \tau_d\right) + \min\left(\left|\frac{1}{d_j^{\alpha_i}} - \frac{1}{d_j^{\alpha_j}}\right|, \tau_d\right). \quad (12)$$

After having obtained a depth stitch by solving Eq. 8, the two-layer fusion module 126 uses it to constrain the subsequent front and back color stitches. Here, the two-layer fusion module 126 stitches 408 the front-warped images using the color values into a foreground panorama. The two-layer fusion module 126 stitches 410 the back-warped images into a background panorama. In performing these stitches, the two-layer fusion module 126 adds two additional data terms that constrain color exposure and depth selection:

$$E_{exposure} = \lambda_5 \sum_i \mu_i^{\alpha_i}, \ E_{depth} = \lambda_6 \sum_i \nu_i^{\alpha_i}. \quad (13)$$

All penalties $\mu_i^{\alpha i}$, $\nu_i^{\alpha i}$ are 0, except in the following conditions. The exposure penalty $\mu_i^{\alpha i}$ is 1 if a pixel is over-exposed (except in the darkest bracket) or under-exposed (except in the brightest bracket). The depth penalty $\nu_i^{\alpha i}$ can be set differently for the front and back color stitch. For example, for the front color stitch, it is set to 1 only if a pixel's depth is not within a factor of [0.95, 1/0.95] of the depth stitch. For the back color stitch, it is set to 1 only if a pixel's depth is less than a factor of 1/0.95 of the depth stitch.

In an embodiment, the two-layer fusion module 126 sets the following balancing coefficients:

$$\lambda_1=5, \lambda_2=50, \lambda_3=\lambda_4=25, \lambda_5=100, \lambda_6=75, \quad (14)$$

and solves the labeling problems at a reduced 512×256 resolution using an alpha expansion algorithm, and upsamples the resulting label map to full resolution (8192× 4096 pixels) using a simple PatchMatch-based upsampling algorithm.

The stitched depth panoramas occasionally still contain small floating elements. The two-layer fusion module 126 "despeckles" them by first identifying strong depth discontinuities between neighboring pixels using a depth ratio test, then finding small disconnected components with fewer than 4096 pixels, and removing them by filling their depths in with a median filter. In addition, the depth map is smoothed with a joint bilateral filter whose kernel is cuts across the discontinuities computed above.

Once the front and back panoramas are generated, the two-layer fusion module 126 then fuses 412 the foreground panorama and the background panorama into the two-layer representation. To do this, the two-layer fusion module 126 represents the two-layer panorama as a graph. Each pixel i in the panorama has up to two nodes that represent the foreground and background layers. If they exist, they are denoted $f_i$ and $b_i$ respectively. Each node n has a depth value d(n) and a foreground/background label l(n)∈ {F, B}. The two-layer fusion module 126 generates for both front and back panoramas, fully 4-connected but disjoint grid-graphs independently. Each node is assigned a depth and label according to the panorama from which it is drawn. These graphs contain redundant coverage of some scene objects, but this is fully intentional and will be useful to remove color fringes around depth continuities. The two-layer fusion module 126 removes the redundancies by removing all the $b_i$ nodes that are too similar to their $f_i$ counterparts, i.e., $d(f_i R)/d(b_i) < \tau_{dratio} = 0.75$.

The result is not redundant, but now the b graph contains many isolated components, and the f graph contains long connections across discontinuities. The connectivity is then recomputed. For each pair of neighboring pixels, the two-layer fusion module 126 considers all f and b nodes if they exist. The two-layer fusion module 126 also consider all pairs of nodes from i and j and sorts them by their depth ratio, most similar first. Then, it connects the most similar pair if the depth ratio is above $\tau_{dratio}$. If there is another pair that can be connected, it is connected unless such a connection would cross an edge.

To this point, the two-layer fusion module 126 has generated a well-connected two-layer graph. The back layer contains some extra content, but large translations can still reveal holes. The back layer is next expanded to further hallucinating depth and color. The two-layer fusion module 126 expands the back layer in an iterative fashion, one pixel ring at a time. In each iteration, the two-layer fusion module 126 identifies b and f nodes that are not connected in one direction. It tentatively creates a new candidate neighbor node for these pixels and sets their depth and colors to the average of the nodes that spawned them. Candidate nodes are kept only if they are not colliding with already existing nodes (using $\tau_{dratio}$), and if they become connected to the nodes that spawned them.

Normal Map Estimation

Figure 5:
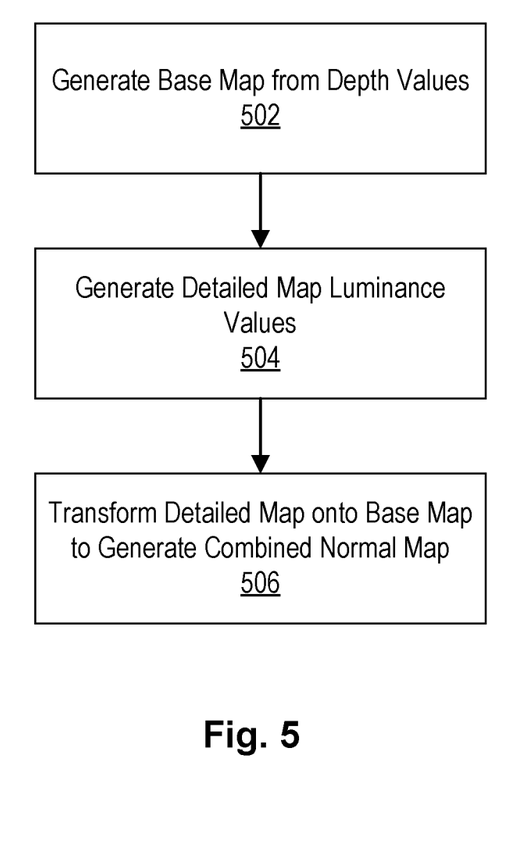
FIG. 5 is a flowchart illustrating an embodiment of a process for generating a normal map for a multi-layer panoramic image.

An optional step in the three-dimensional reconstruction pipeline is to compute a normal map. In one embodiment, the goal is merely to compute a normal that looks plausible and good enough for simple artist-driven lighting effects, rather than an accurate normal map of the scene. A process for generating the normal map is illustrated in FIG. 5. In this embodiment, the normal map estimation module 128 generates 502 a first (base) normal map from the depth values in the two-layer panorama that is accurate with respect to surface slopes but not textures on each surface. The normal map estimation module 128 also generates 504 a second (details) map from the luminance values that has surface details that are artistically-driven to produce desired effects in response to lighting. The normal map estimation module 128 then transforms 506 the second normal map (with the texture details) onto the first normal map (with accurate orientation) to get a combined normal map that serves are a good approximation for the scene.

In one embodiment, the base normal map is piece-wise smooth but discontinuous at depth edges, and contain the correct surface slopes. This normal map is computed by filtering the depth normals with a guided filter, guided by the depth map. A wide window size may be used that corresponds to about a solid angle of about 17.5 degrees.

To generate the details map, the normal map estimation module 128 hallucinates from the luminance image, estimating a normal map by hallucinating a depth map just from the image data, assuming surface depth is inversely related to image intensity. While the depth generated in this manner is highly approximate, it is fully consistent with the image data and provides a surprisingly effective means for recovering geometric detail variations.

The two normal maps are then combined. For a given pixel with polar and azimuthal angles $(\theta,\varphi)$, $n_f$ is the normal obtained by applying the guided filter to the depth normals, and $n_i$ is the normal obtained from the image-based estimation method. $R_s$ is a local coordinate frame for the image-based normal. It is obtained by setting the first row to a vector pointing radially outward, $$R_{s,0} = \sin\theta\cos\varphi, \cos\theta, \sin\theta\sin\varphi), \quad (15)$$

and the other rows through cross products with the world up vector $w_{up}$.

$$R_{s,1} = \frac{R_{s,0} \times w_{up}}{\|R_{s,0} \times w_{up}\|}, R_{s,2} = R_{s,0} \times R_{s,1} \quad (16)$$

A similar coordinate frame $R_f$ is defined for the filtered depth normal, by setting $R_{f,0} = -n_f$ and the other rows analog to Eq. 16. Then, the normal map estimation module 128 transfers the details as follows:

$$n_c = R_f^{-1} R_s n_i \quad (17)$$

The resulting normal map can then be provided with the two-layer mesh to a 3D rendering system 130 for viewing by another user.

Additional Embodiments

The above described processes generate a three-dimensional reconstructed image from a set of images of a scene. the above-described processes may similarly be applied to a set of videos of a the scene by generating a three-dimensional image from corresponding frames in the set of videos (e.g., at each time instance) and combining the three-dimensional images in a sequence of three-dimensional video frames.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method comprising:
   receiving a plurality of input images of a scene taken from different vantage points;
   processing the plurality of input images to generate a sparse reconstruction representation of the scene, the sparse reconstruction representation including a sparse point cloud specifying locations of a plurality of points that correspond to three-dimensional locations of surfaces of objects in the scene;
   based in part on the sparse reconstruction representation, processing the plurality of input images to generate respective dense reconstruction representations of each of the plurality of input images, the respective dense reconstruction representations each including respective depth images for the plurality of input images, the depth images including color and depth information;
   projecting front surfaces of the depth images using a forward depth test to generate a plurality of front-warped images;
   projecting back surfaces of the depth images using an inverted depth test to generate a plurality of back-warped images;
   stitching the front-warped images and the back-warped images to generate a two-layer panorama having a front surface panorama and a back surface panorama; and
   fusing the front surface panorama and the back surface panorama in the two-layer panorama to generate the three-dimensional image comprising a multi-layered geometric mesh suitable for rendering the scene in the three-dimensional space.

2. The method of claim 1, wherein processing the plurality of input images to generate the sparse reconstruction representation comprises:
   applying a surface-from-motion algorithm to the plurality of input images.

3. The method of claim 1, wherein processing the plurality of input images to generate the respective dense reconstruction representations comprises:
   generating a near envelope prior that assigns a cost to estimated depth values in front of a near envelope; and
   applying a multi-view stereo processing algorithm to estimate the depth values based on a cost function including the near envelope prior.

4. The method of claim 3, wherein generating the near envelope prior comprises:
   identifying anchor pixels in the plurality of input images that have high confidence depth estimates;
   propagating the depth estimates of the anchor pixels to other pixels in the plurality of input images to generate approximate depth maps;
   filtering the approximate depth maps to determine a near envelope; and
   generating the near envelope prior based on the depth estimates and the near envelope.

5. The method of claim 1, wherein stitching the front-warped images and the back-warped images to generate a two-layer panorama comprises:
   stitching a depth panorama using depth values from the front-warped images;
   stitching the front surface panorama using color values from the front-warped images and stitched depth values from the depth panorama;
   stitching the back surface panorama using color values from the back-warped images and the stitched depth values from the depth panorama; and
   combining the front surface panorama and the back surface panorama into the two-layer panorama.

6. The method of claim 1, wherein fusing the front surface panorama and the back surface panorama comprises:
   removing background pixels from the back surface panorama that match corresponding foreground pixels in the front surface panorama;
   storing connections between neighboring pixels meeting a threshold similarity in depth and color information; and
   hallucinating color and depth information in missing pixel locations.

7. The method of claim 1, further comprising:
   generating a normal map for the multi-layered geometric mesh, the normal map estimating for each pixel, an angle normal to a surface depicted by the pixel.

8. The method of claim 7, wherein generating the normal map comprises:
   generating a base normal map from depth values in the three-dimensional image;
   generating a detailed normal from luminance values in the three-dimensional image; and
   transforming the detailed normal map onto the base normal map to generate a combined normal map.

9. The method of claim 1, wherein the plurality of input images having varying levels of overlap and orientation changes.

10. A non-transitory computer-readable storage medium storing instructions, the instructions when executed by a processor causing the processor to perform steps including:
    receiving a plurality of input images of a scene taken from different vantage points;
    processing the plurality of input images to generate a sparse reconstruction representation of the scene, the sparse reconstruction representation including a sparse point cloud specifying locations of a plurality of points that correspond to three-dimensional locations of surfaces of objects in the scene;
    based in part on the sparse reconstruction representation, processing the plurality of input images to generate respective dense reconstruction representations of each of the plurality of input images, the respective dense reconstruction representations each including respective depth images for the plurality of input images, the depth images including color and depth information;
    projecting front surfaces of the depth images using a forward depth test to generate a plurality of front-warped images;
    projecting back surfaces of the depth images using an inverted depth test to generate a plurality of back-warped images;
    stitching the front-warped images and the back-warped images to generate a two-layer panorama having a front surface panorama and a back surface panorama;

fusing the front surface panorama and the back surface panorama in the two-layer panorama to generate the three-dimensional image comprising a multi-layered geometric mesh suitable for rendering the scene in the three-dimensional space.

11. The non-transitory computer-readable storage medium of claim 10, wherein processing the plurality of input images to generate the sparse reconstruction representation comprises:
applying a surface-from-motion algorithm to the plurality of input images.

12. The non-transitory computer-readable storage medium of claim 10, wherein processing the plurality of input images to generate the respective dense reconstruction representations comprises:
generating a near envelope prior that assigns a cost to estimated depth values in front of a near envelope; and
applying a multi-view stereo processing algorithm to estimate the depth values based on a cost function including the near envelope prior.

13. The non-transitory computer-readable storage medium of claim 12, wherein generating the near envelope prior comprises:
identifying anchor pixels in the plurality of input images that have high confidence depth estimates;
propagating the depth estimates of the anchor pixels to other pixels in the plurality of input images to generate approximate depth maps;
filtering the approximate depth maps to determine a near envelope; and
generating the near envelope prior based on the depth estimates and the near envelope.

14. The non-transitory computer-readable storage medium of claim 10, wherein stitching the front-warped images and the back-warped images to generate a two-layer panorama comprises:
stitching a depth panorama using depth values from the front-warped images;
stitching the front surface panorama using color values from the front-warped images and stitched depth values from the depth panorama;
stitching the back surface panorama using color values from the back-warped images and the stitched depth values from the depth panorama; and
combining the front surface panorama and the back surface panorama into the two-layer panorama.

15. The non-transitory computer-readable storage medium of claim 10, wherein fusing the front surface panorama and the back surface panorama comprises:
removing background pixels from the back surface panorama that match corresponding foreground pixels in the front surface panorama;
storing connections between neighboring pixels meeting a threshold similarity in depth and color information; and
hallucinating color and depth information in missing pixel locations.

16. The non-transitory computer-readable storage medium of claim 10, wherein the instructions when executed by processor further cause the processor to perform steps including:
generating a normal map for the multi-layered geometric mesh, the normal map estimating for each pixel, an angle normal to a surface depicted by the pixel.

17. The non-transitory computer-readable storage medium of claim 16, wherein generating the normal map comprises:
generating a base normal map from depth values in the three-dimensional image;
generating a detailed normal from luminance values in the three-dimensional image; and
transforming the detailed normal map onto the base normal map to generate a combined normal map.

18. The non-transitory computer-readable storage medium of claim 10, wherein the plurality of input images having varying levels of overlap and orientation changes.

19. A system comprising:
a processor; and
a non-transitory computer-readable storage medium storing instruction for generating a three-dimensional image, the instructions when executed by a processor causing the processor to perform steps including:
receiving a plurality of input images of a scene taken from different vantage points;
processing the plurality of input images to generate a sparse reconstruction representation of the scene, the sparse reconstruction representation including a sparse point cloud specifying locations of a plurality of points that correspond to three-dimensional locations of surfaces of objects in the scene;
based in part on the sparse reconstruction representation, processing the plurality of input images to generate respective dense reconstruction representations of each of the plurality of input images, the respective dense reconstruction representations each including respective depth images for the plurality of input images, the depth images including color and depth information;
projecting front surfaces of the depth images using a forward depth test to generate a plurality of front-warped images;
projecting back surfaces of the depth images using an inverted depth test to generate a plurality of back-warped images;
stitching the front-warped images and the back-warped images to generate a two-layer panorama having a front surface panorama and a back surface panorama;
fusing the front surface panorama and the back surface panorama in the two-layer panorama to generate the three-dimensional image comprising a multi-layered geometric mesh suitable for rendering the scene in the three-dimensional space.

20. The system of claim 19, wherein stitching the front-warped images and the back-warped images to generate a two-layer panorama comprises:
stitching a depth panorama using depth values from the front-warped images;
stitching the front surface panorama using color values from the front-warped images and stitched depth values from the depth panorama;
stitching the back surface panorama using color values from the back-warped images and the stitched depth values from the depth panorama; and
combining the front surface panorama and the back surface panorama into the two-layer panorama.

* * * * *